(12) United States Patent  
Feldman et al.

(10) Patent No.: US 8,732,389 B2  
(45) Date of Patent: May 20, 2014

(54) MEMORY WEAR CONTROL

(75) Inventors: Timothy Richard Feldman, Louisville, CO (US); Jonathan Williams Haines, Boulder, CO (US); Brett Alan Cook, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 676 days.

(21) Appl. No.: 12/489,604

(22) Filed: Jun. 23, 2009

(65) Prior Publication Data

US 2010/0325340 A1 Dec. 23, 2010

(51) Int. Cl.  
*G06F 13/00* (2006.01)

(52) U.S. Cl.  
USPC ............ 711/103; 711/100; 711/102; 711/154; 711/114; 711/170; 710/8

(58) Field of Classification Search  
CPC ... G06F 12/02; G06F 12/023; G06F 12/0246; G06F 2211/1073; G06F 2212/7211  
USPC .......... 711/103, 100, 114, 154, 170, E12.001, 711/E12.008, 113, 156, 206, 208; 710/8  
See application file for complete search history.

(56) References Cited

U.S. PATENT DOCUMENTS

| | | | |
|---|---|---|---|
| 6,850,443 B2 * | 2/2005 | Lofgren et al. | 365/185.29 |
| 7,315,917 B2 * | 1/2008 | Bennett et al. | 711/103 |
| 7,747,813 B2 | 6/2010 | Danilak | |
| 7,970,983 B2 * | 6/2011 | Nochimowski | 711/103 |
| 8,010,738 B1 * | 8/2011 | Chilton et al. | 711/103 |
| 2007/0263454 A1 | 11/2007 | Cornwell et al. | |
| 2008/0320214 A1 | 12/2008 | Ma et al. | |
| 2009/0132758 A1 * | 5/2009 | Jiang et al. | 711/103 |
| 2009/0172253 A1 * | 7/2009 | Rothman et al. | 711/103 |
| 2010/0161880 A1 * | 6/2010 | You | 711/103 |

* cited by examiner

*Primary Examiner* — Arpan P. Savla  
*Assistant Examiner* — Zhuo Li  
(74) *Attorney, Agent, or Firm* — Westman, Champlin & Koehler, P.A.

(57) ABSTRACT

The disclosure is related to systems and methods of controlling wear of a memory. In a particular embodiment, a system is disclosed that comprises a memory and a performance governor circuit coupled to the memory. The performance governor circuit is adapted to control a wear of the memory as a function of time.

21 Claims, 6 Drawing Sheets

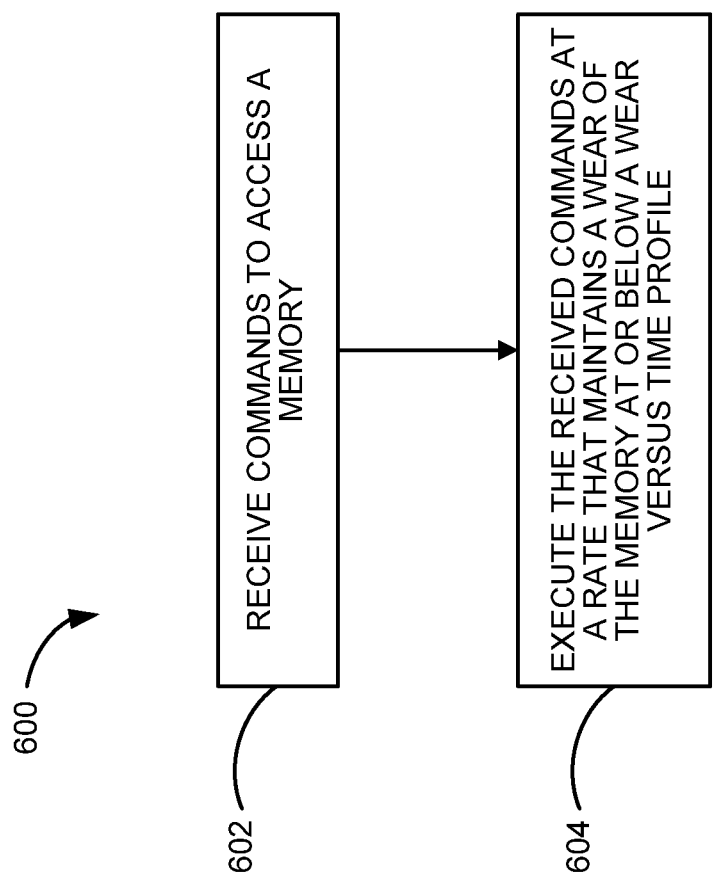

MEMORY WEAR CONTROL

FIELD OF THE DISCLOSURE

The present disclosure is generally related to managing memory. Further, the present disclosure is also generally related to controlling wear on a memory.

BRIEF DESCRIPTION OF THE DRAWINGS

FIG. 6 is a flow diagram of an embodiment of a method of memory management that involves controlling wear on a memory.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related to systems and methods of controlling wear on a memory. The systems and methods described herein are particularly useful for flash memory systems; however, the systems and methods described herein can be applied to any type of memory system that is subject to wear.

In the field of data storage devices, most prior devices did not wear out due to use of media in the devices. Others, such as flash-based devices, have wear limits due to limited program-erase cycles on each physical block of the memory, but the wear limits do not limit the use of the device to attain a claimed or warranted endurance or lifetime specification. In particular, write operations that instigate program-erase cycles that contribute to wear are allowed without restriction. This leads to the problem that expected lifetime of the device might not be delivered if the program-erase cycles are consumed too rapidly.

In a particular embodiment, a system is disclosed that includes a performance governor circuit adapted to connect to a memory and adapted to control a degree of wear of the memory as a function of at least one selected point in time.

In another particular embodiment, a method is disclosed that includes receiving commands to access a memory. The method also includes executing the received commands at a rate that maintains a wear of the memory at or below a wear versus time profile.

In yet another particular embodiment, a system is disclosed that includes a memory. A performance governor circuit is coupled to the memory, the performance governor circuit is adapted to execute a command to access the memory at a rate that maintains a wear of the memory at or below a wear versus time profile.

Figure 1:
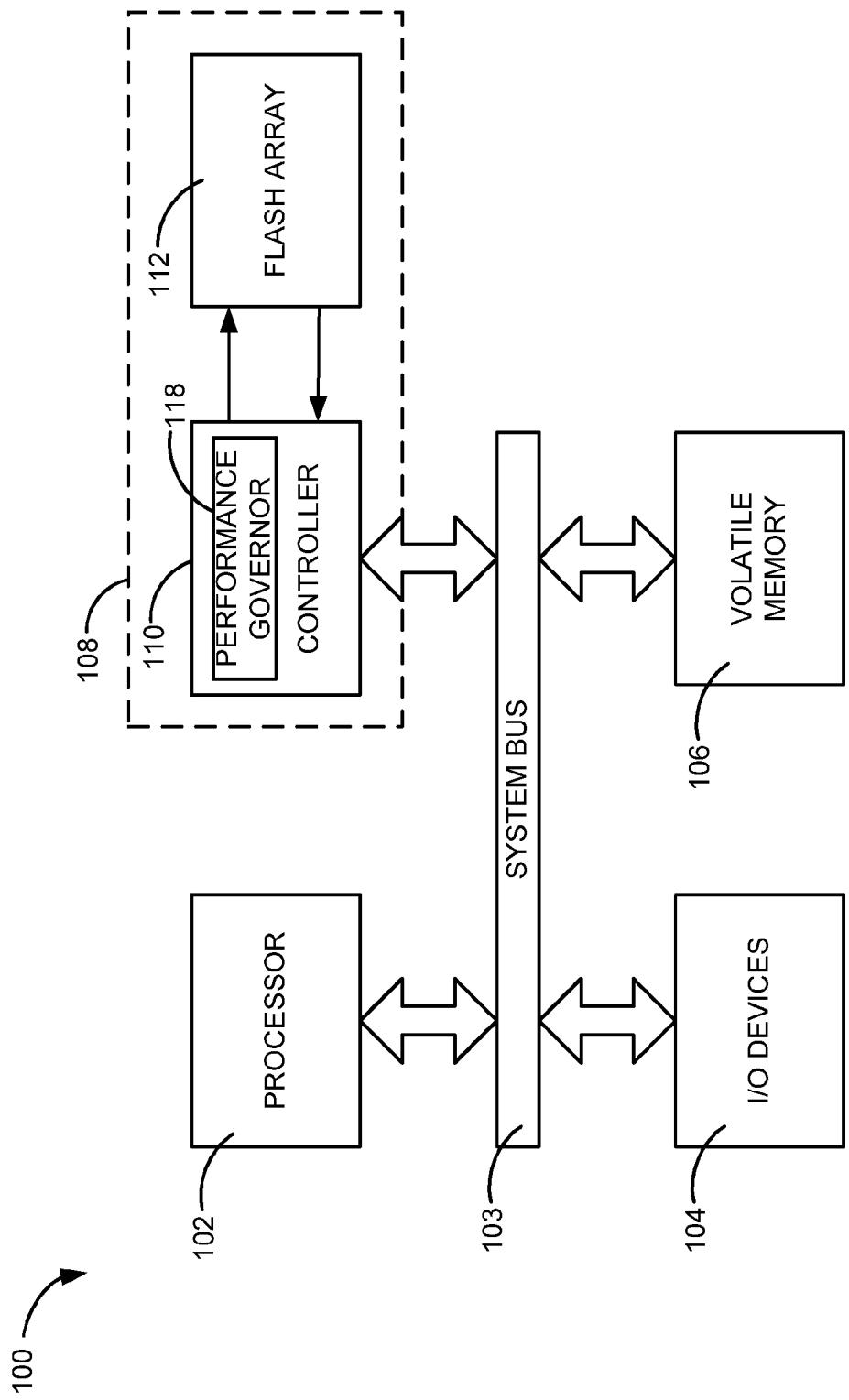
FIG. 1 is a diagram of an illustrative embodiment of a system of memory management that implements memory wear control.

Referring to FIG. 1, a particular embodiment of a system of memory management is shown and generally designated 100. The system of memory management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus may also be coupled to a memory device 108. In a particular embodiment, the memory device 108 comprises a non-volatile flash memory device.

The memory device 108 may include a controller 110, which may be coupled to the processor 102 via a connection through the system bus 103. The controller may include a performance governor 118, which described in detail further below. The memory device 108 may also contain an array of memory cells 112. The array of memory cells 112 may include one or more integrated circuit memory chips.

During operation, the processor 102 may send a command and data to the memory device 108 to retrieve or store data. The controller 110 can receive the command and data from the processor 102 and then manage the execution of the command to store or retrieve data from the array of memory cells 112.

In a particular embodiment, the array of memory cells 112 may comprise memory, such as flash memory, that has a wear limit due to limited program-erase cycles on each physical block of the memory. Also, as indicated above, memory device 108 has a specified lifetime. In conventional devices, the lifetime of a memory device, such as memory 108, is not associated with the wear rate of memory array 112. Thus, even in the case of conventional devices that employ memory wear-leveling, which involves arranging data so that erasures and re-writes are distributed evenly across the medium, carry out the wear-leveling independently of the specified lifetime of the device. In general, conventional wear-leveling processes deal with the concentration of write cycles in different portions of the memory, but do not control wear of the memory as a whole as a function of time. In a particular embodiment, performance governor 118 is configured to be "aware" of a wear rate of memory array 112 and the specified lifetime of device 108. Utilizing this information, governor 118 adjusts a performance a device 108 and the attendant wear of memory array 112 as needed to help ensure that device 108 meets the specified lifetime. In general, performance governor 118 is capable of controlling a wear of memory 112 as a function of time. Specifically, performance governor 118 is capable of controlling a degree of wear (or a wear level) of the memory as a function of at least one selected point in time. The at least one selected point in time may be non-predetermined or a predetermined point in time such as the specified lifetime of the device 108. Also, performance governor 118 operates independently of any wear-leveling processes and therefore is capable of controlling the wear of memory 112 independently of whether memory 112 utilizes and wear-leveling processes.

Figure 2:
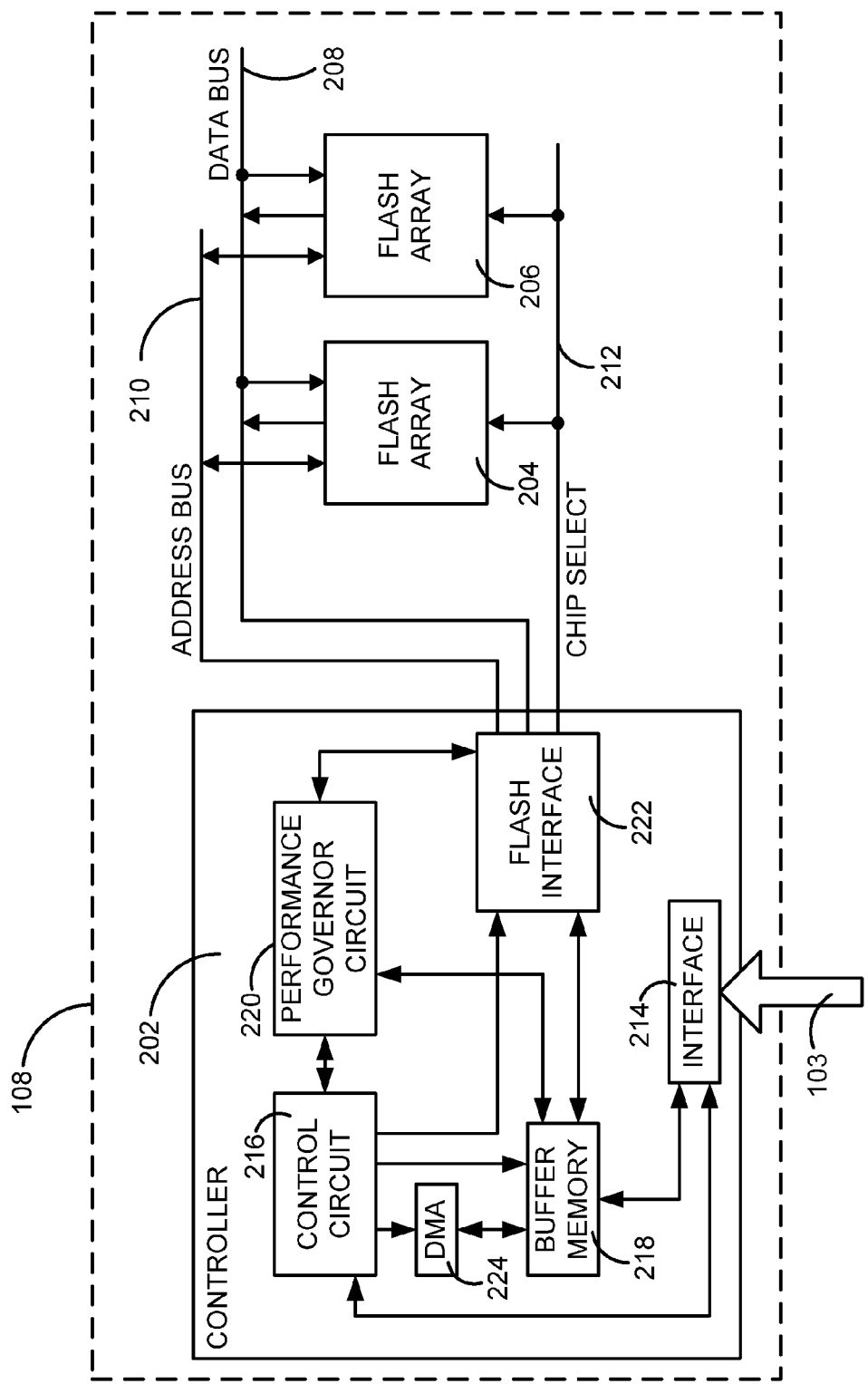
FIG. 2 is a diagram of another illustrative embodiment of a system of memory management that implements memory wear control.

Referring to FIG. 2, a particular embodiment of the memory device 108 is shown. The memory device 108 may include a controller 202 coupled to a first memory array 204 and a second memory array 206 via a data bus 208, an address bus 210, and a chip select bus 212. Each memory array may be a nonvolatile flash memory array. In another embodiment, more memory arrays may be coupled to the data bus 208, the address bus 210, and the chip select bus 212 than are shown in FIG. 2. In still another embodiment, only one memory array may be coupled to the data bus 208 and the address bus 210.

The controller 202 may be coupled to the system bus 103 via an interface 214 that can receive and send commands and data to a host, such as the processor 102 in FIG. 1. The interface 214 may pass the command to control circuit 216 for processing and also store the received data in a buffer memory 218. In a particular embodiment, the memory interface 222 may be a flash memory interface.

The memory interface 222 can receive data from the buffer memory 218 to be written to one of the memory arrays 204 or 206 and receive address bits from the control circuit 216. The memory interface 222 may assert corresponding data and address bits with appropriate timing and format to a selected flash array. Memory interface 222 may also read previously stored data from any selected sector of memory array 204 or 206. The control circuit 216 may also be coupled to a direct memory address (DMA) controller 224 to allow the control circuit 216 to access the memory arrays 204 and 206 for reading and writing data. DMA controller 224 may operate in conjunction with memory interface 222 to perform maintenance operations on memory arrays 204 and 206. The maintenance operations can include, for example, moving data between arrays 204 and 206 or moving data within each array 204, 206. In general, control circuits 216 and 224 operate in conjunction memory interface 222 to execute memory access requests that are received from a host or access operations that are internally carried out in connection with memory maintenance operations, etc.

As can be seen in FIG. 2, performance governor circuit 220 is included within controller 202. As indicated earlier, performance governor circuit 220 adjusts a performance of memory array 204, 206 as needed to help ensure that device 108 meets its specified lifetime. The specified lifetime may be a time period measured from the date of manufacture of the device, from the date of first use of the device, or may be only based on the cumulative power on time of the device, for example.

Figure 3:
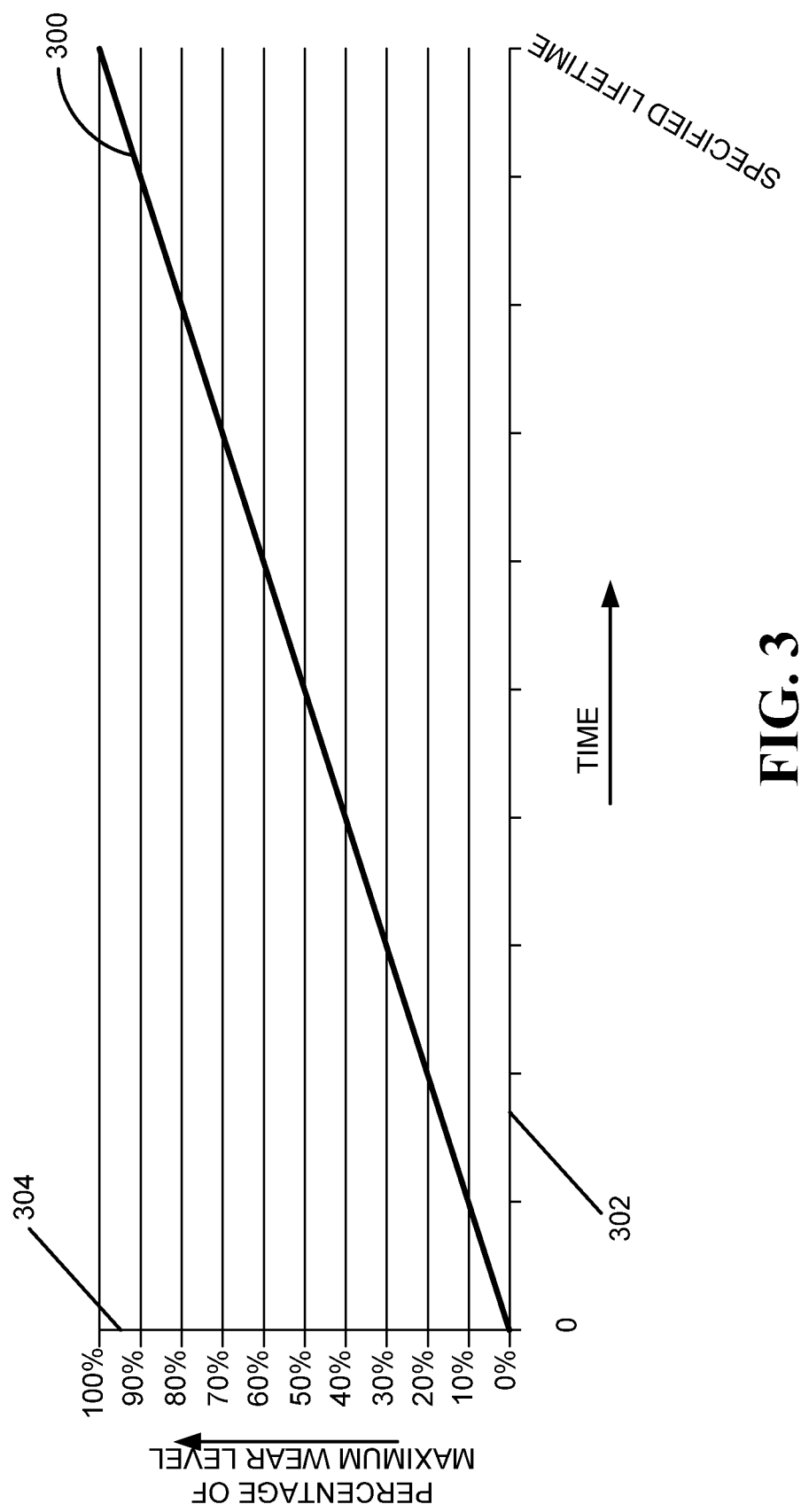
FIG. 3 through 5 are graphs that illustrate wear versus time profiles.
Figure 4:
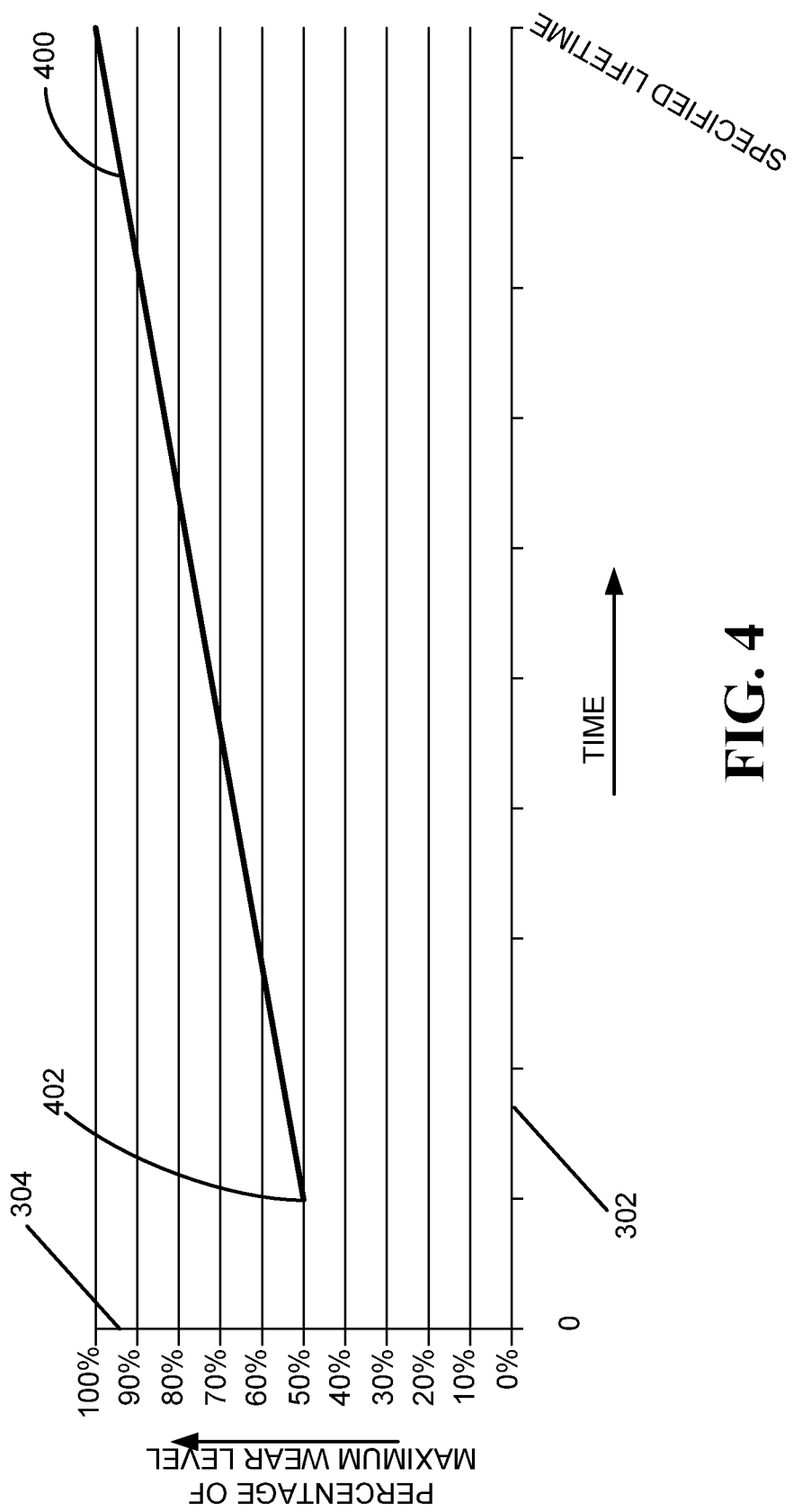

Performance governor circuit 220 controls a wear of the memory 204, 206 as a function of time. In a particular embodiment, performance governor circuit 220 is adapted to control the wear of the memory 204, 206 as a function of time by preventing the wear from exceeding a wear level specified by a wear versus time profile. FIGS. 3 and 4 show specific examples of wear versus time profiles. In the examples shown in FIGS. 3 and 4, the wear versus time profiles are unbroken lines. However, it should be noted that, in some applications, the wear versus time profile may be a piecewise profile. Details regarding the examples of FIGS. 2 and 3 are provided further below.

In one particular embodiment, performance governor circuit 220 is adapted to control a wear of the memory 204, 206 as a function of time by preventing the memory 204, 206 from exceeding predetermined wear levels prior to predetermined times. The predetermined times may be from the date of manufacture of the device, from the date of first use of the device, or may be based on the cumulative power on time of the device, for example.

Performance governor circuit 220 may be programmed with the predetermined wear level(s) for the memory 204, 206 and may include an algorithm to compute wear levels at different points in time and compare the computed wear levels with the predetermined wear level(s). In a particular embodiment, the wear level is a count of program-erase cycles carried out on the memory 204, 206. In another particular embodiment, the wear level may be a function of one or more measured characteristics of the memory 204, 206 at any given point in time. In flash memories, a speed of memory access changes over the life of the memory and therefore, in one embodiment, one measured characteristic utilized to calculate the wear level(s) may be the speed of memory access. In flash and other memories, a measurable error rate after each storage operation on a storage medium degrades over time and therefore represents a level of wear of the storage medium. In flash memories, there may be an additional decay of error rate each time the memory is programmed. This may also be utilized as a parameter to calculate wear level of the memory. Also, in flash memories and phase-change memories, degradation of error rate may take place even when data is simply stored in the memory for a relatively long period of time. This may be due to charge leaking out of floating gates in flash memory and due to thermal decay in phase-change memories. In general, one or more measurable parameters of the memory 204, 206 may be used by performance governor circuit 220 to determine the wear level of the memory 204, 206 at any given point in time. Also, one or more measurable parameters of the memory 204, 206, such as those described above, may be used by performance governor circuit 220 for the computation of wear versus time profiles of the memory 204, 206.

In some embodiments, in response to a new command, the control circuit 216 determines the wear effect of executing the new command. In one specific embodiment, control circuit 216 computes an amount of space that has to be erased from memory 204, 206 in order to execute the new command (or group of commands) and provides the computed value, which represents the wear effect of executing the new command, to the performance governor circuit 220. In one embodiment, control circuit 216 comprises an algorithm that predicts a contribution of the new command to the wear rate of device 108. In general, control circuit 216 provides information (for example, a wear value) related to the wear effect of executing the new command to the performance governor circuit 220 which, in turn, determines whether this wear value will cause a current memory wear to exceed the wear versus time profile. If governor circuit 220 determines that the wear value will not cause the current memory wear to exceed the wear versus time profile with a smallest possible command completion time, then the command is executed. In one embodiment, if governor circuit 220 determines that the wear value will cause the current memory wear to exceed the wear versus time profile with a smallest possible command completion time, then the governor circuit 220 effects the execution of the command to have a longer command completion time that allows a resultant current memory wear level not to exceed the profile. In another embodiment, if governor circuit 220 determines that the wear value will cause the current memory wear to exceed the wear versus time profile, then governor circuit 220 causes the command not to be executed completely, but instead to end with a non-completed status indication. In still another embodiment, performance governor circuit 220 is configured to delay completion of an operation to access memory 204, 206 when a current memory wear exceeds the wear versus time profile. In yet another embodiment, performance governor circuit 220 is configured not to complete an operation to access memory 204, 206 when a current memory wear exceeds the wear versus time profile.

In one embodiment, control circuit 216 and performance governor circuit 220 are substantially integrated. In such an embodiment, control circuit 216 and performance governor circuit 220 are implemented in a common processor and include program code stored on a common computer storage medium. In another embodiment, control circuit 216 and performance governor circuit 220 are implemented in different processors, with different computer storage media utilized to store program code for the respective circuits. In general, any suitable processor or suitable combination of processors along with one or more computer storage media may be used to implement control circuit 216 and performance governor circuit 220.

FIG. 3 is a graph illustrating one example of a wear versus time profile that is implemented in a particular embodiment of performance governor circuit such as 220. Horizontal axis 302 is a time axis and vertical axis 304 represents percentage of maximum wear level. Plot 300 is a maximum cumulative wear line, which is one example of a predetermined constant cumulative wear rate. Specifically, the maximum cumulative wear line 300 is a maximum cumulative wear rate to minimally ensure that the memory 204, 206 meets its specified lifetime. In a particular embodiment, the performance governor circuit is configured to keep a wear level of the memory below its maximum cumulative wear line 300 at all times during the life of the memory. In another embodiment, the performance governor circuit is configured to keep the wear level of the memory from exceeding its maximum cumulative wear line 300 at all times during the life of the memory. As indicated earlier, zero on time axis 302 may be the time of manufacture of the device, a time of first use of the device or a beginning of power on time, for example.

In general, a memory system that has bursts of high wear inducing activity interspersed with periods of low wear activity benefits from a performance governor circuit that regulates performance according to cumulative wear (or a cumulative wear rate) rather than instantaneous wear. Thus, depending on the type of application, the performance governor circuit may control memory performance based on cumulative wear rate and/or or instantaneous wear.

In contrast with a memory system that has bursts of high wear inducing activity interspersed with periods of low wear activity, a memory system that initially has high wear inducing activity could be penalized with low performance if the performance governor circuit is active immediately. This is particularly acute for benchmarking and other evaluation activities, system integration and software installation activities. Thus, in certain embodiments, it is valuable to allow the wear initially to exceed the constant cumulative wear line 300 shown in FIG. 3. This allowance can be allowed to persist for a specified time, for example 10% of the specified lifetime, or it can persist for a specified amount of wear, for example 10% of the wear capability of the device.

After this allowance period has expired, wear control functions of the performance governor circuit 220 are activated. If, upon activation, the performance governor circuit 220 determines that the wear is currently above the constant cumulative wear rate, for example, then a period of zero wear regulation is typically avoided. Instead, the performance governor circuit 220 implements a suitable function. In a particular embodiment, the performance governor circuit 220 implements a function that extrapolates from the current wear point to 100% wear at specified lifetime and keeps the device wear at or below that line. FIG. 4 is a graph illustrating an example in which the memory device had 50% of its wear used in the first 10% of its life. Thus, plot 400 begins at point 402 and the wear regulation carried out by the performance governor circuit 220 begins upon completion of 10% of the life of the device.

Figure 5:
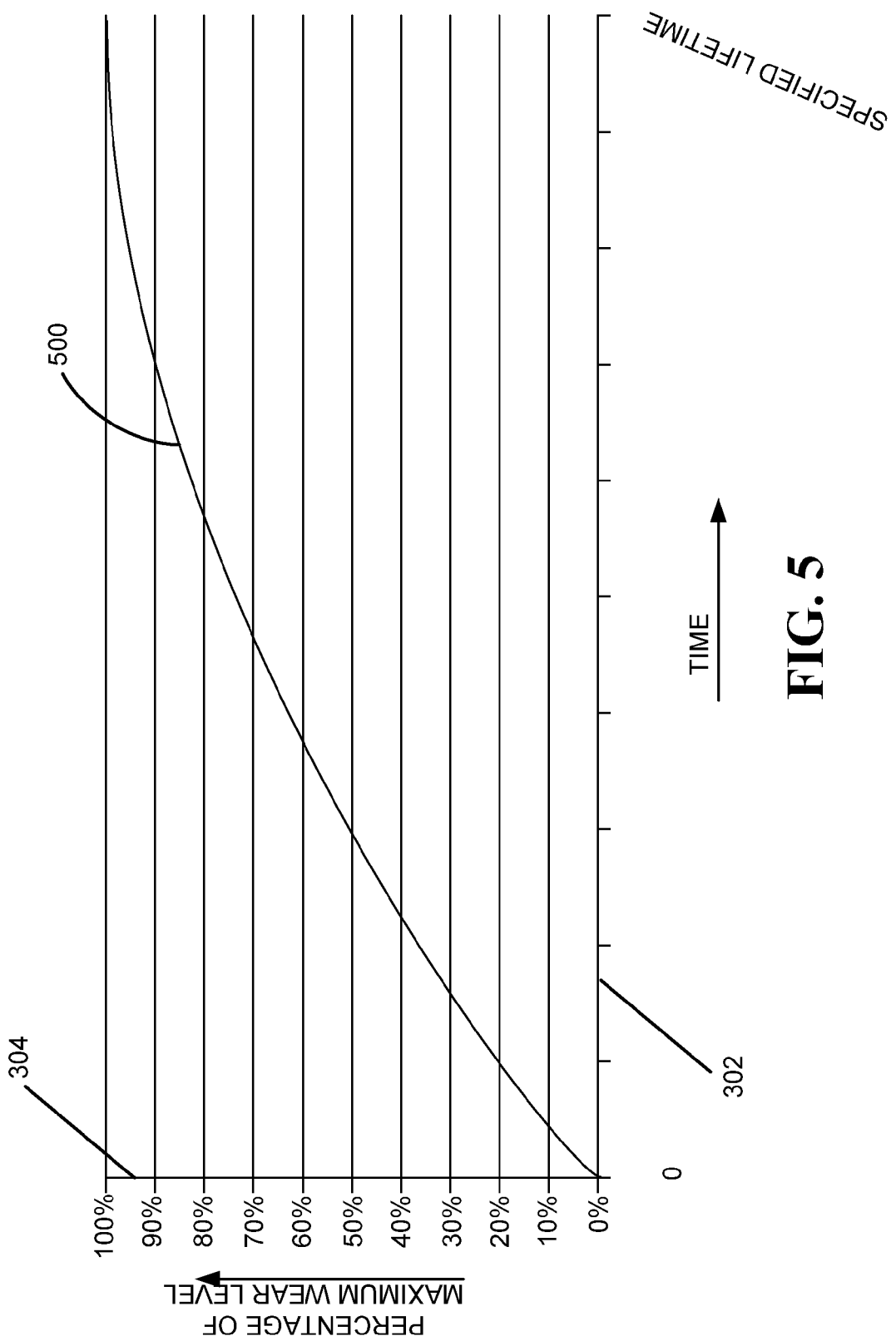

FIGS. 3 and 4 show linear wear versus time profiles. However, in some embodiments, non-linear wear versus time profiles may be suitable. FIG. 5 shows an example of a non-linear wear versus time profile. In FIG. 5, plot 500 is a concave downward curve that is based on the following:

$$f(t)=K1(1-k2^{**}(-t))$$ Equation 1 where k1 and k2 (which is the base value that is raised to the power −t) are constants and t is time. The constants k1 and k2 are chosen to elicit the desired (t, f(t)) values at the t value that represents end-of-life of the memory device, and the value of the equation at that point (the wear profile value desired at end-of-life)), with a concavity that is as-desired. In some embodiments, Equation 1 is modified to include a third constant that affects how "time-shifted" plot 500 is, which could alternatively be shown as a time offset. Also, in some embodiments, a wear versus time profile that includes linear and non-linear portions may be suitable.

In different embodiments, options for calculating the maximum cumulative wear other than those described above can be used by the performance governor circuit 220. A particular embodiment recognizes a worst case workload for wear rate and the command completion time limits for that workload. Supporting the workload at its maximum command completion time or just faster is one limit to a device's ability to govern to the specified lifetime while conforming to other command requirements. A maximum cumulative wear line that has this slope and intercepts the 100% wear at the specified lifetime is a wear line that can be enforced, even for worst case workloads, while meeting other requirements.

Other functions based on the history of the use of the memory 204, 206 can be implemented to control wear as a function of time. For instance, a current wear rate allowed by the performance governor circuit 220 could be a function of a current wear rate and a target wear rate to meet the specified lifetime.

There are additional problems when dealing with workloads that cause wear rates past an acceptable constant rate. Firstly, command completion can be delayed so that the rate does not exceed the point currently being enforced by the performance governor circuit 220. But this can possibly violate other command completion requirements. Solutions to this can be to purposely exceed those other limits, or to return error status to commands that, if completed within their time limits, would cause the memory 204, 206 to exceed its current wear limit.

When the memory 204, 206 is operating near a current wear limit, a single command may cause the current wear to be too large even if the command does not complete until its maximum command completion time limit. If the device 108 completes part of the command and then quits due to the current wear limit, then some wear has been spent without benefit. A host is likely to retry the same command, and if the situation continues to persist because wear has increased due to the previous unsuccessful attempt, then the device 108 may persistently not be able to complete the command. To avoid this, in a particular embodiment, the device 108 is configured to carry out data comparisons to note that part of the retried command has been completed and use those already written media locations, making the spent wear now have benefit. In an alternative embodiment, the device 108 may allow the initial command to complete successfully—exceeding the current wear limit momentarily—and then for subsequent commands not perform any wear inducing operations and return error status. This behavior needs to persist only until enough time has passed that the current wear is below the new wear limit.

A memory device such as 108 may include alternative storage methods available that have less associated wear, but are otherwise not preferred for other reasons such as performance or power. In one such embodiment, data may be stored and updated in buffer memory 218 or a separate phase-change RAM (not shown) and moved to memory 204, 206 only after certain predetermined events. For example, when a user of a host with which device 108 is used edits a file within a software application, any modifications to the file during editing can be stored in the buffer memory 218 or the separate phase-change RAM. The file may be moved from the buffer memory 218 or the separate phase-change RAM to memory 204, 206 only after the user exits the software program. Other alternative storage methods can include utilizing a compressed encoding scheme for data that is stored; the compressed encoding scheme utilizes fewer bits than an unencoded representation of the same information would use. In general, particular embodiments of memory device 108 may optionally use one or more of these alternatives to avoid exceeding the current wear limit. This may also induce cleanup to a preferred state later when wear limits and other constraints allow.

In some embodiments, performance governor circuit 220 is configured to receive a shutdown command from a host processor 102 (FIG. 1) and responsively shut itself down, either temporarily or permanently, under certain predetermined conditions. One of the conditions is the expiration of the specified lifetime/warranty period of device 108. Another condition could be that the workload on the memory 204, 206 is at or below a predetermined workload level for a predetermined time period, with the predetermined workload level being below (or even substantially below) a worst case workload for the wear rate limit. In certain embodiments, the shutdown command for the performance governor circuit 220 could be received and executed by control circuit 216.

In some embodiments, performance governor circuit 220 is programmed with performance goal information or performance expectations for device 108. In such embodiments, performance governor circuit 220 is configured to lower a performance of device 108 below, or substantially below, performance expectations when performance goals are not important. Here, performance may be lowered for certain access requests that are received from a host or access operations that are internally carried out in connection with memory maintenance operations, for example. Examples of substantially performance goal-independent host access requests may be scheduled virus scans and file defragmentation requests. Substantially performance goal-independent internal access requests can include an internally scheduled data compaction activity.

Referring to FIG. 6, a very simplified flow diagram of a particular illustrative embodiment of a method of memory management is shown and generally designated 600. The method 600 may be implemented via the performance governor 118 or the performance governor 220. The method 600 may include receiving commands to access a memory at 602. The method may then include executing the received commands at a rate that maintains a wear of the memory at or below a wear versus time profile, at 604.

In accordance with various embodiments, the methods described herein may be implemented as one or more software programs running on a computer processor or controller, such as the controller 110 or the controller 202. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a performance governor circuit adapted to connect to a memory and adapted to control a degree of wear of the memory as a function of at least one selected point in time by:
      preventing the wear from exceeding a wear level specified by a wear versus time profile;
      determining a wear effect of executing a new command to access the memory on a current memory wear by examining a computed wear value for the new command; and
      controlling execution of the new command based on the determined wear effect and based on a smallest possible command completion time of the new command; and
      wherein the performance governor circuit is further configured to determine whether the computed wear value will cause the current memory wear to exceed the wear versus time profile, and if the wear value will not cause the current memory wear to exceed the wear versus time profile within the smallest possible command completion time, then execute the command.

2. The system of claim 1, wherein the performance governor circuit is adapted to control a degree of wear of the memory as a function of at least one selected point in time by preventing the memory from exceeding at least one predetermined wear level prior to at least one predetermined time.

3. The system of claim 2, wherein the at least one predetermined wear level comprises predetermined wear levels and the at least one predetermined time comprises predetermined times, with each predetermined time of the predetermined times corresponding to a different individual one of the predetermined wear levels, and wherein the performance governor circuit is adapted to control a degree of wear of the memory as a function of at least one selected point in time by preventing the memory from exceeding the predetermined wear levels prior to the respective predetermined times.

4. The system of claim 3, wherein the predetermined wear levels are wear limits of the memory at the respective predetermined times.

5. The system of claim 2, wherein the at least one predetermined time is a specified lifetime of the memory.

6. The system of claim 2, wherein the at least one predetermined wear level is a wear limit of the memory, and wherein the at least one predetermined time is a specified lifetime of the memory.

7. The system of claim 1, wherein the wear versus time profile is a predetermined constant cumulative wear rate.

8. The system of claim 7, wherein the predetermined constant cumulative wear rate is a maximum cumulative wear rate to minimally ensure that the memory meets its specified lifetime.

9. The system of claim 1, wherein the performance governor circuit is configured to maintain the wear of the memory at or below the wear versus time profile at all times during the specified lifetime of the memory.

10. The system of claim 1, wherein the performance governor circuit is configured to maintain the wear of the memory at or below the wear versus time profile for at least a portion of the specified lifetime of the memory.

11. The system of claim 1, wherein the wear versus time profile is calculated after one of a predetermined time from first use of the memory, a predetermined amount of wear of the memory or a predetermined amount of access of the memory.

12. The system of claim 1, wherein the performance governor circuit is configured to utilize alternative storage methods to prevent the wear rate of the memory from exceeding the wear versus time profile.

13. The system of claim 1 and wherein, if the performance governor circuit determines that the wear value will cause the current memory wear to exceed the wear versus time profile within the smallest possible command completion time, then the performance governor circuit effects the execution of the command to have a longer command completion time that allows a resultant current memory wear level not to exceed the wear versus time profile.

14. The system of claim 1 and wherein, if the performance governor circuit determines that the wear value will cause the current memory wear to exceed the wear versus time profile within the smallest possible command completion time, then the performance governor circuit causes the command not to be executed completely and to end with a non-completed status indication.

15. The system of claim 14 and wherein the performance governor circuit is further configured to complete an incomplete portion of the command that was not executed completely, the completion of the incomplete portion of the command is carried out upon receipt of a resubmitted command.

16. A method comprising:
receiving commands to access a memory;
controlling a degree of wear of the memory as a function of at least one selected point in time by:
preventing the wear from exceeding a wear level specified by a wear versus time profile;
determining a wear effect of executing a new command of the received commends to access the memory on a current memory wear by examining a computed wear value for the new command;
controlling execution of the new command based on the determined wear effect and based on a smallest possible command completion time of the new command; and
determining whether the computed wear value will cause the current memory wear to exceed the wear versus time profile, and if the wear value will not cause the current memory wear to exceed the wear versus time profile within the smallest possible command completion time, then executing the command.

17. The method of claim 16, wherein the wear versus time profile is a predetermined constant cumulative wear rate.

18. The method of claim 16, wherein the predetermined constant cumulative wear rate is a maximum cumulative wear rate to minimally ensure that the memory meets its specified lifetime.

19. The method of claim 16 and wherein, if the wear value will cause the current memory wear to exceed the wear versus time profile within the smallest possible command completion time, then effect the execution of the command to have a longer command completion time that allows a resultant current memory wear level not to exceed the wear versus time profile.

20. The method of claim 16 and wherein, if the wear value will cause the current memory wear to exceed the wear versus time profile within the smallest possible command completion time, then cause the command not to be executed completely and to end with a non-completed status indication.

21. The method of claim 20 and further comprising completing an incomplete portion of the command that was not executed completely, wherein the completion of the incomplete portion of the command is carried out upon receipt of a resubmitted command.

* * * * *